United States Patent [19]

Abato et al.

[11] Patent Number: 5,553,265
[45] Date of Patent: Sep. 3, 1996

[54] METHODS AND SYSTEM FOR MERGING DATA DURING CACHE CHECKING AND WRITE-BACK CYCLES FOR MEMORY READS AND WRITES

[75] Inventors: Richard P. Abato, Brookline, N.H.; William R. Greer, Waterville, Vt.; Christopher M. Herring, Longmont, Colo.

[73] Assignee: International Business Machines Corporation, Armonk, N.Y.

[21] Appl. No.: 326,973

[22] Filed: Oct. 21, 1994

[51] Int. Cl.6 ............................................... G06F 13/00
[52] U.S. Cl. ...................... 395/470; 395/467; 395/471; 395/473
[58] Field of Search ........................... 395/449, 467, 395/468, 470, 471, 473

[56] References Cited

U.S. PATENT DOCUMENTS

| | | | |
|---|---|---|---|
| 4,301,505 | 11/1981 | Catiller et al. | 395/500 |
| 4,467,419 | 8/1984 | Wakai | 395/445 |
| 4,539,677 | 9/1985 | Lo | 370/85.1 |
| 4,630,230 | 12/1986 | Sundet | 395/496 |
| 4,665,481 | 5/1987 | Stonier et al. | 395/842 |
| 4,797,813 | 1/1989 | Igarashi | 395/445 |
| 4,899,275 | 2/1990 | Sachs et al. | 395/403 |
| 5,008,816 | 4/1991 | Fogg, Jr. et al. | 395/410 |
| 5,010,516 | 4/1991 | Oates | 365/49 |
| 5,014,187 | 5/1991 | Debize et al. | 395/886 |
| 5,115,411 | 5/1992 | Kass et al. | 365/189.01 |
| 5,117,428 | 5/1992 | Jeppesen, III et al. | 371/51.1 |
| 5,233,692 | 8/1993 | Gajjar et al. | 395/309 |
| 5,265,237 | 11/1993 | Tobias et al. | 395/500 |
| 5,276,849 | 1/1994 | Patel | 395/468 |
| 5,293,603 | 3/1994 | MacWilliams et al. | 395/309 |

FOREIGN PATENT DOCUMENTS

| | | |
|---|---|---|
| 0470739 | 7/1991 | European Pat. Off. |
| 58-169277 | 10/1983 | Japan |
| 59-16190 | 1/1984 | Japan |
| 61-139855 | 6/1986 | Japan |
| 63-228856 | 9/1988 | Japan |
| WO91/03785 | 3/1991 | WIPO |

*Primary Examiner*—David L. Robertson
*Attorney, Agent, or Firm*—Heslin & Rothenberg, P.C.

[57] ABSTRACT

Methods and system for memory control in a computer system having a store-in cache. In response to main memory read or write requests from a secondary processor, data is transferred into a buffer during a snoop cycle to the store-in cache. The data in the buffer is merged with write-back data from the store-in cache in a write operation. Data is provided directly from the buffer to the secondary processor and to main memory in a read operation. The buffer can be placed on a memory controller of the computer system. A second store-in cache can also be used for main memory transfers.

43 Claims, 6 Drawing Sheets

METHODS AND SYSTEM FOR MERGING DATA DURING CACHE CHECKING AND WRITE-BACK CYCLES FOR MEMORY READS AND WRITES

TECHNICAL FIELD

The present invention relates in general to computer processing systems. More particularly, the present invention relates to computer memory access and control systems which employ cache memory.

BACKGROUND OF THE INVENTION

Conventional computer systems employ a central processing unit ("CPU") for performing logical operations on digital data elements, and main memory for storing digital data elements. An operation inherent in such systems is the transfer of data elements between the CPU and main memory. The time required to transfer the data often becomes a dominant factor in the processing performance of the computer system. The transfer time can be influenced by limitations on the transfer bus size and speed, the physical location of the CPU and main memory, or the size or access time of main memory.

Cache memory systems are employed in many computer systems to decrease the impact of main memory transfers on system performance. A cache memory is usually smaller than the main memory and is located near the CPU. A cache memory stores recently-accessed data which has a high probability of being subsequently accessed by the CPU.

Two general categories of cache memories are known in the art. Caches in the first category are designated as store-thru or write-thru. Data written to a store-thru cache is also simultaneously written to main memory. Thus, cached data in a store-thru cache will always match the data at a corresponding address in main memory. On a subsequent CPU read from the same address, the data is available in the cache and a main memory transfer is not required.

Caches in the second category are designated as store-in or write-back. Data is written to a store-in cache without simultaneously updating main memory. Thus, cached data in the cache and data at a corresponding address in main memory may be different. Write-back cycles are thus periodically performed which write the cached data to main memory so that the main memory contains updated data.

The main memory of the computer system may often be shared among multiple processing resources in addition to the CPU. For example, external input/output ("I/O") devices may be employed to perform a variety of I/O functions including magnetic media data storage, printing, etc., or additional general processing units may be employed. Any such additional processing resource is referred to herein as a secondary processor. If a secondary processor requires read or write access to main memory and a store-in cache is employed near the central processor (CPU), the contents of the cache and the contents of main memory may be different if a write-back cycle has not yet been performed. This difference is generally known to the system and can be reflected in the logic of the cache which maintains an update indicator or a "dirty bit". The dirty bit indicates that data has been written to the cache but has not yet been written to main memory in a write-back cycle. When a secondary processor requires read or write access to main memory, a check or "snoop" cycle is performed to determine whether dirty data is held at the relevant address in the cache. If the check cycle reveals that the data is dirty, or updated with respect to corresponding data in main memory, the data in the cache must be written back to main memory using a write-back cycle before the secondary processor can access the data in main memory.

Access to main memory from a secondary processor therefore requires (1) a conventional read or write request; (2) a snoop cycle; (3) a possible write-back cycle; and (4) the eventual main memory access by the secondary processor. During the snoop cycle and the possible write-back cycle, the secondary processor is idle, i.e., waiting for clean snoop results, or dirty results and a write-back. This idle time can lead to significant performance degradation. The performance degradation can be particularly serious if the store-in cache is designed such that a write-back cycle encompasses all bytes of a single cache block or cache line. For example, if the secondary processor requires access to only 4 bytes within a 32-byte block, the processor must wait for a snoop and a full write-back of 32 bytes before accessing the 4 bytes. Thus, for a simple 4-byte read access from main memory, the secondary processor incurs the idle time associated with (1) a snoop cycle and (2) a write-back of a 32-byte cache line.

An alternative approach to main memory access is thus required in which a secondary processor does not incur the performance degradation associated with a store-in cache near the central processor.

SUMMARY OF THE INVENTION

The present invention provides both an apparatus and methods for optimizing main memory access in a computer system which employs a store-in cache near the central processor. In a first aspect of the invention, a memory control system is provided. The memory control system is provided for a computer system having a main memory with a plurality of storage locations, the plurality of storage locations having a plurality of memory addresses corresponding thereto. The computer system also has a first memory having a plurality of storage locations for holding a plurality of first data elements, the plurality of first data elements also having the plurality of memory addresses associated therewith and further having a first update indicator associated therewith for indicating whether a data element in the first plurality of data elements has been updated with respect to a corresponding data element stored at one of the plurality of storage locations in main memory. The computer system further comprises a means for checking status of the first update indicator in response to a main memory write request from a secondary processor. The memory control system comprises a second memory for storing at least one second data element from the secondary processor in response to the main memory write request. The second data element has associated therewith one of the plurality of memory addresses corresponding to the plurality of storage locations of main memory and is to be written to main memory using the one of the plurality of memory addresses. The second data element is to be written to main memory when the computer system's means for checking has completed checking the status of the first update indicator associated with the first plurality of data elements. The memory control system may store the second data element while the computer system's means for checking is checking the status of the first update indicator associated with the plurality of first data elements.

The memory control system may further include writing means for writing to the plurality of storage locations of main memory when the computer system's means for checking has completed checking the status of the first update indicator. The writing means may include first means for writing to the plurality of storage locations a first data element from the first memory and a second data element from the second memory if the first update indicator indicates that one of the plurality of first data elements is updated with respect to a corresponding data element stored at one of the plurality of storage locations of main memory. The writing means may include second means for writing to the plurality of storage locations only one second data element if the first update indicator indicates that none of the plurality of first data elements is updated with respect to a corresponding data element stored at one of a plurality of storage locations of main memory.

In another aspect of the invention, a method for responding to a request from a secondary processor to write secondary processor data to main memory is provided. The method is employed in a computer system having a main memory and a first store-in cache associated therewith for storing cached data, the cached data having associated therewith a first update indicator for indicating whether a data element of the cached data has been updated with respect to a corresponding data element in main memory. The method comprises the step of checking the first update indicator associated with the cached data in the first store-in cache upon the request. The method further comprises, simultaneous with the checking step, using a buffer to temporarily store secondary processor data from the secondary processor, the secondary processor data to be written to main memory after completion of the checking step.

The method may further include the step of merging the secondary processor data stored in the buffer and the cache data from the first store-in cache into a data stream to be written to main memory if the first update indicator indicates that a data element of the cached data is updated with respect to a corresponding data element in main memory. The method may also include the step of writing the secondary processor stored in the buffer to main memory if the update indicator indicates that none of the data elements of the cached data has been updated with respect to a corresponding data element in main memory.

In another aspect of the invention, a method for responding to a main memory write request from a secondary processor is provided. The method is employed in a computer system having a main memory, a primary processor, a store-in cache for the primary processor, and a secondary processor, and wherein the computer system performs a plurality of write-back cycles, each write-back cycle updating the main memory with a data stream from the store-in cache. The method comprises the step of inserting secondary processor data elements from the secondary processor into the data stream during at least one of the write back cycles. The inserting step may include the step of buffering the secondary processor data elements from the secondary processor, and may also include transferring data elements from the store-in cache into the buffer.

In another aspect of the invention, a memory control system is provided. The memory control system is provided for a computer system having a main memory with a plurality of storage locations, the plurality of storage locations having a plurality of memory addresses corresponding thereto, a first memory having a plurality of storage locations for holding a plurality of first data elements, the plurality of first data elements having the plurality of memory addresses associated therewith and a first update indicator associated therewith for indicating whether a data element of the plurality of first data elements has been updated with respect to a corresponding data element stored at one of the plurality of storage locations in main memory. The computer system further comprises a means for checking status of the first update indicator in response to a main memory read request from a secondary processor. The memory control system includes a second memory for storing at least one second data element in response to the main memory read request. The second data element has associated therewith one of the plurality of memory addresses corresponding to the plurality of storage locations of main memory and is to be provided to the secondary processor when the computer system's means for checking has completed checking the status of the first update indicator associated with the first plurality of data elements.

The memory control system may receive the second data element from one of the plurality of storage locations in main memory while the computer system's means for checking is checking the status of the first update indicator associated with the first plurality of data elements.

The memory control system may further include means for providing the second data element to a secondary processor if the first update indicator indicates that none of the plurality of first data elements is updated with respect to a corresponding data element in main memory. The memory control system may also include means for transferring the plurality of first data elements from the first memory to the second memory if the first update indicator indicates that one of the plurality of first data elements is updated with respect to a corresponding data element in main memory and means for concurrently writing the transferred plurality of first data elements from the second memory to main memory and to the secondary processor.

In another aspect of the invention, a method for responding to a request from a secondary processor to read at least one memory data element from main memory is provided. The method is employed in a computer system having a main memory and a first store-in cache associated therewith for storing cached data, the cached data having associated therewith a first update indicator for indicating whether a data element of the cached data has been updated with respect to a corresponding data element in main memory. The method includes the steps of checking the first update indicator associated with the cached data in the first store-in cache in response to the request and simultaneous with the checking step, using a buffer to temporarily store a memory data element, the memory data element being pre-fetched from the main memory into the buffer.

The method may further include transferring the cached data to the buffer and concurrently providing the transferred cache data from the buffer to the secondary processor and main memory if the update indicator indicates that a data element of the cache data has been updated with respect to a corresponding data element in main memory. The method may also comprise the step of transferring the pre-fetched memory data element from the buffer to the secondary processor if the update indicator indicates that a data element of the cached data has not been updated with respect to a corresponding data element in main memory.

In another aspect of the invention, a method for responding to a main memory read request from a secondary processor is provided. The method is employed in a computer system having a main memory, a primary processor, a store-in cache for the primary processor, and a secondary processor, and wherein the computer system performs a plurality of write-back cycles, each write-back cycle updating the main memory with data from the store-in cache. The method comprises the step of transferring at least one data element from the store-in cache to the secondary processor during at least one of the write-back cycles. The method further comprises transferring a data element from the store-in cache to a buffer and transferring the data element from the buffer to the secondary processor. The method may further include transferring the data element from the buffer to main memory.

The present invention thus provides a system and methods which optimize main memory access from a secondary processor in a computer system which employs a store-in cache near the central processor.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description of the invention and the accompanying drawings in which:

DESCRIPTION OF THE INVENTION

Broadly stated, the present invention comprises methods and a system for optimizing read and write operations to main memory in a computer system. More particularly, the present invention optimizes read and write operations to main memory for a computer system which employs store-in caches between a central processor and main memory.

As discussed above, performance degradation occurs if a secondary processor in the system, for instance, an I/O bus master on an external I/O bus, requires access to data in main memory. Because of the characteristics inherent in a store-in cache system, a possibility exists that data in the store-in cache and corresponding data in main memory are different and, thus, any access to main memory directly from an I/O bus master could corrupt data in the system. Snoop or check cycles are thus required to check the store-in cache for updated data before access to main memory from an I/O bus master is granted. An I/O bus master is usually required to wait for the completion of the snoop or check cycle as well as the possible write-back cycle.

The present invention provides a merge buffer placed, in a preferred embodiment, within the memory controller circuitry of the computer system. During a snoop cycle, data is transferred to and from the merge buffer to be held temporarily while the snoop cycle is occurring. Following the snoop cycle, the buffer is employed to optimize the write-back cycle. By employing the merge buffer, an I/O bus master is not idled during the snoop cycle, but instead, continues to transfer data into the merge buffer. Thus, the system does not suffer the performance degradation associated with conventional store-in cache systems and the snoop cycles and write-back cycles associated therewith.

Figure 1:
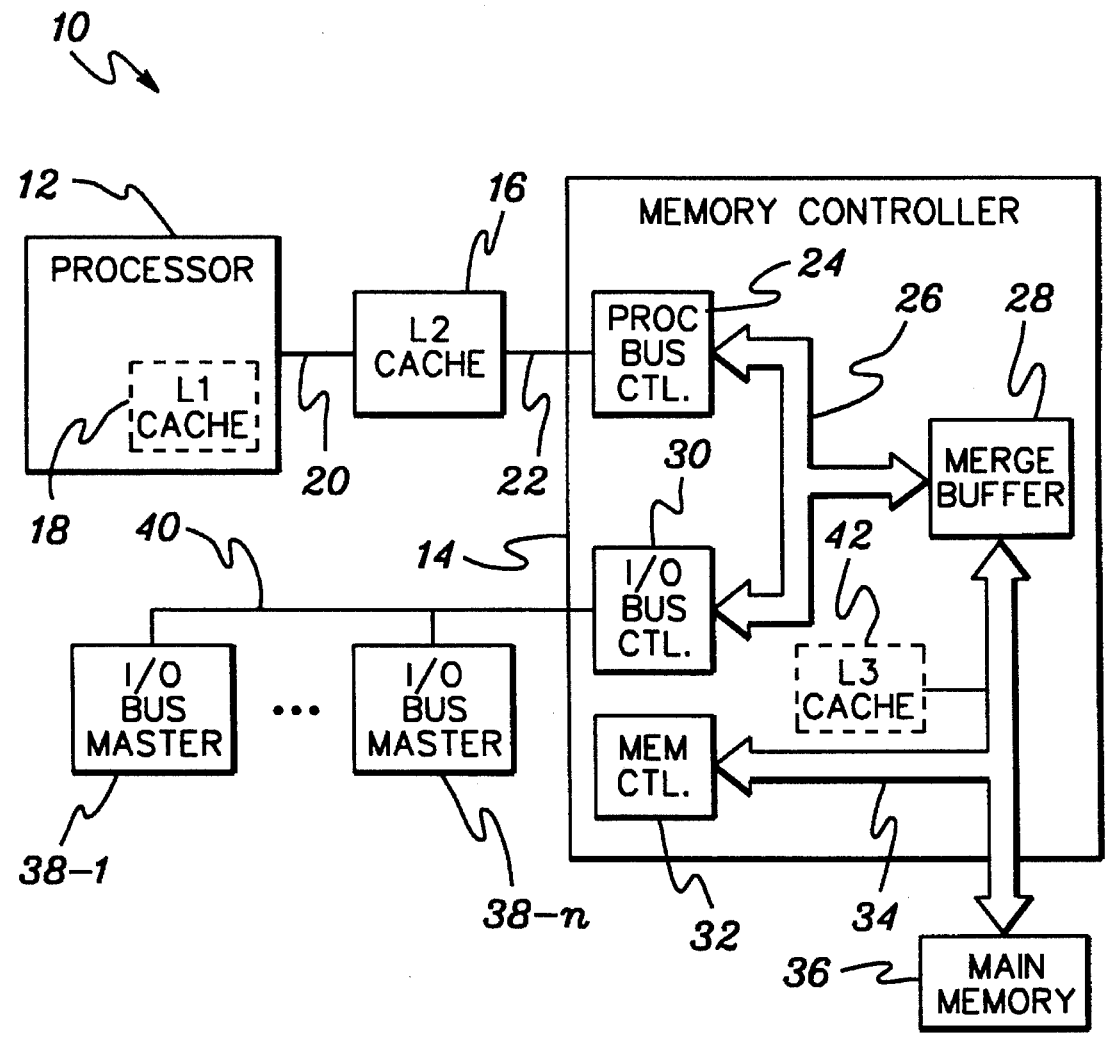
FIG. 1 illustrates a computer system having a memory controller and a merge buffer in accordance with the principles of the present invention.
Figure 2:
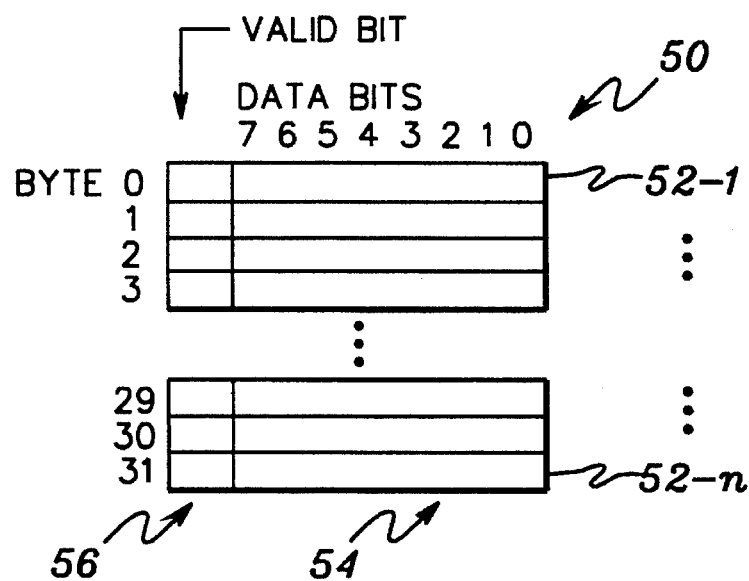
FIG. 2 illustrates an embodiment of the structure of a merge buffer in accordance with the principles of the present invention.
Figure 3:
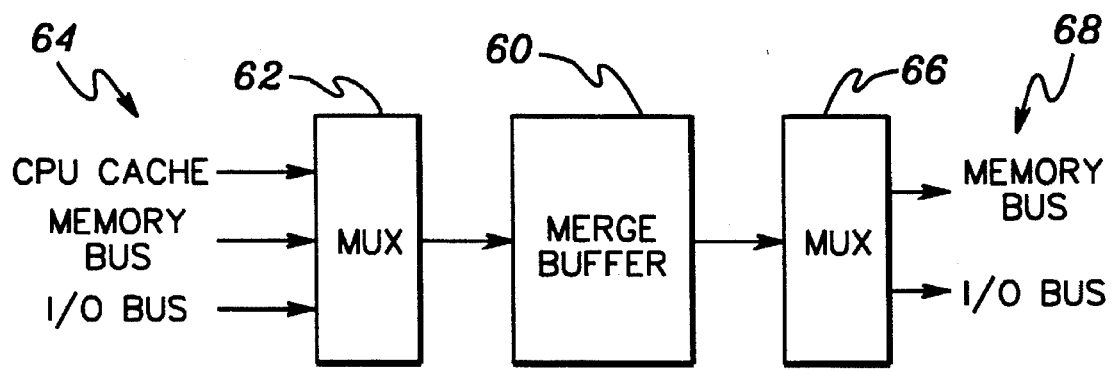
FIG. 3 illustrates data flows to and from a merge buffer in accordance with the principles of the present invention.

FIGS. 1–3 illustrate an embodiment of a merge buffer, placed in a computer system. FIGS. 4–7 illustrate the specific methods for using the merge buffer in write and read operations.

With reference to FIG. 1, a computer system 10 is shown having a central processor 12. A memory controller 14 is provided and normally controls access to main memory 36 from various devices within the system, including the central processor 10. The terms "main memory" and "memory controller" are employed broadly herein and can denote any data destination and control logic therefor, respectively, in a computer processing system. As is known in the art, the system can also include an L2 store-in cache 16, placed serially between bus 20 and bus 22. An L2 store-in cache can also be placed on a processor bus in a look-aside mode, wherein a processor bus comprises a continuous connection between the processor and memory controller, with the cache connected thereto. As an alternative or in addition to an L2 cache, an L1 cache 18 can be employed on the processor itself. As used herein, the concept of a store-in cache includes either an L1 or L2 cache associated with the processor and main memory.

A store-in cache can comprise a plurality of memory blocks or lines. Each block can either be direct-mapped to addresses of storage locations in main memory or, alternatively can be "associative," wherein a data element stored in the cache can be placed in any address in main memory. In a fully associative cache, additional logic is necessary so that data elements stored in the store-in cache can be associated with any main memory address. Data stored in the cache is herein referred to as cached data. The terms "associated with" when used herein to describe the relationship between cached data elements and storage locations in memory merely denote that the cached data elements and storage locations in memory have common addresses, regardless of the specific address mapping technique employed in the cache.

Computer system 10 also normally comprises an I/O system comprising an I/O bus 40 which connects I/O bus masters 38-1 to 38-n to an I/O bus controller 30 within memory controller 14. Each I/O bus master usually performs a specific I/O function such as magnetic storage, printing, etc.

Memory controller 14 controls all system access to main memory 36, including accesses from processor 12 and access from I/O bus masters 38-1 to 38-n. To accomplish this access, the memory controller usually includes processor bus controller 24, I/O bus controller 30 and a main memory controller 32. Standard connections known to those skilled in the art between the processor bus controller 24, I/O bus controller 30 and the main memory controller 32 are not shown.

Pursuant to the principles of the present invention, a merge buffer 28 is employed in memory controller 14. The merge buffer accepts data from a secondary processor (i.e., an I/O bus master) during a snoop cycle to the cache 16 or 18 on a write cycle, which write cycle comprises a request from an I/O bus master to write data to main memory. The merge buffer is then used in a modified write-back cycle following the snoop cycle.

A merge buffer is also employed during a read cycle from an I/O bus controller to main memory, in which case data from main memory is pre-fetched into the merge buffer during the snoop cycle associated with the read cycle. The merge buffer is again used in a modified write-back cycle following the snoop cycle. By employing the merge buffer in connection with the methods discussed below, I/O bus masters can continue processing despite the fact that snoop cycles are in progress to the store-in cache 16 or 18. Thus, the I/O bus master is not prevented from continuing processing upon the issuance of the snoop, and optimized write-back cycles are employed.

Buses 26 and 34 are employed to effect the necessary transfers between the merge buffer and the various system components. Also depicted in FIG. 1 is an additional cache 42, i.e., an additional L3 store-in cache on the memory controller. Cache 42 can further improve access to main memory 36 from I/O bus masters 38-1 to 38-n, as discussed further below.

An exemplary embodiment of a merge buffer 50 is depicted in FIG. 2. Data storage locations 52-1 to 52-n are depicted each having a data component 54 and a valid bit 56 associated therewith. The data component 54 as shown can comprise a byte of data or 8 data bits. The size of the merge buffer 50 is 32 bytes represented by byte 0 through byte 31. In a preferred embodiment, the merge buffer is implemented with a number of storage locations equal to the number of storage locations in one block or line of the store-in cache. The valid bit provided for each data storage location generally indicates that new data has been placed in the associated storage location and is to be written to main memory. Those skilled in the art will recognize that many merge buffer configurations are possible.

As discussed further below, following the completion of a snoop cycle, which indicates that data in the store-in cache is dirty, or updated with respect to a corresponding data element in main memory, data elements may exist in both the cache and the merge buffer which require writing to main memory. Thus, the merge buffer must be accessible from both the secondary processor and the store-in cache. One example of the access granted is illustrated in FIG. 3, wherein a multiplexer 62 is provided which multiplexes merge buffer input data from sources 64. For instance, cache, memory and I/O bus data are multiplexed into the merge buffer 60. Multiplexer 66 is provided which multiplexes merge buffer output data to data destinations 68 including, for example, memory bus and I/O bus. Multiplexers 62 and 66 are implemented in connection with buses 26 and 34 in FIG. 1.

As discussed above, the merge buffer is employed in both read and write operations from an I/O bus master or secondary processor to main memory. These operations are now discussed in detail with reference to FIGS. 4–7.

Figure 4:
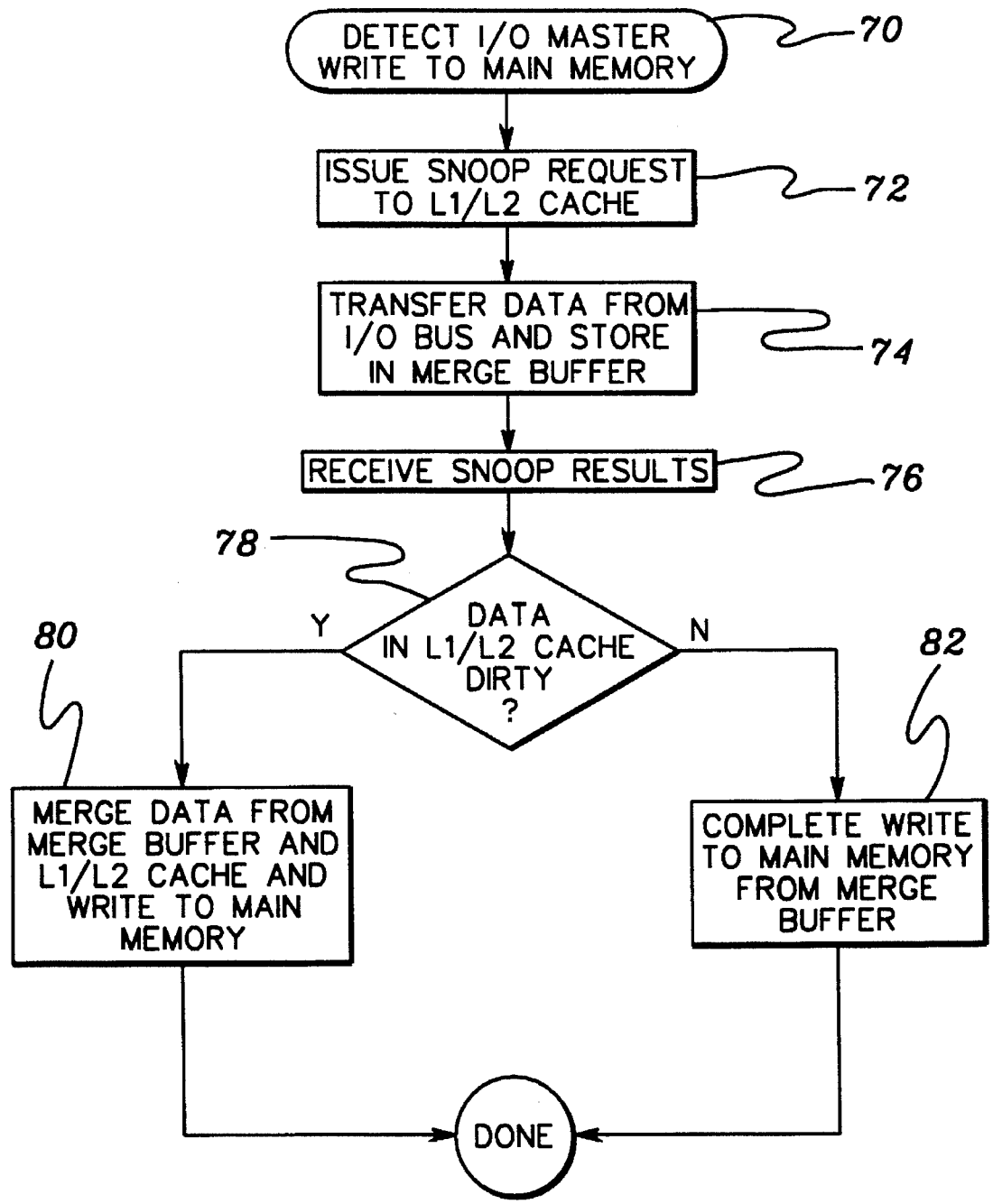
FIG. 4 is a flow diagram for a "write" to main memory, using a merge buffer, in accordance with the principles of the present invention.

FIG. 4 depicts the steps associated with an exemplary write operation from an I/O master to main memory according to the principles of the present invention. Entry is made through STEP 70, "DETECT I/O MASTER WRITE TO MAIN MEMORY." In this step, an I/O master has data to be written to main memory and issues the appropriate write request to the memory controller. In STEP 72, "ISSUE SNOOP REQUEST TO L1/L2 CACHE," the memory controller initiates a snoop or check cycle to the relevant store-in cache to detect whether updated data exists in the store-in cache. Simultaneous with the snoop cycle, the I/O bus master transfers data into the merge buffer on the memory controller pursuant to the principles of the present invention. This is represented by STEP 74, "TRANSFER DATA FROM I/O BUS AND STORE IN MERGE BUFFER." Thus, the I/O bus master need not wait to receive snoop results to begin transferring data. Upon the completion of the snoop cycle, STEP 76, "RECEIVE SNOOP RESULTS" occurs. A determination has thus been made as to whether the data in the store-in cache has been updated with respect to corresponding data in main memory. This is represented by INQUIRY 78, "DATA IN L1/L2 CACHE DIRTY?" If the data in the L1/L2 cache is dirty, or updated with respect to corresponding data in main memory, the method proceeds along the "YES" branch to STEP 80, "MERGE DATA FROM MERGE BUFFER AND L1/L2 CACHE AND WRITE TO MAIN MEMORY." A write-back cycle is necessary, but this cycle is modified pursuant to the principles of the present invention.

As discussed above with reference to FIG. 2, each storage location in the merge buffer has associated therewith a corresponding valid bit. During the data transfer (STEP 74), each byte written from the secondary processor or the I/O bus master would have a valid bit set. In STEP 80, only those bytes from the I/O processor having their valid bits set will be written to main memory. However, the remainder of the cached data from the store-in cache will be used to fill the merge buffer and locations without the valid bit set. Thus, the most current data from both the I/O bus master and the store-in cache are merged into a single data stream in the merge buffer and written to main memory from the merge buffer. In the preferred embodiment, this merge operation actually occurs in the merge buffer by using the valid data bits. During the merge operation, for every byte within the buffer that had its valid bit set, the data from the CPU or the store-in cache would be discarded for those bits, eventually filling the entire buffer with the most recent valid data for main memory. The memory controller would continue the memory cycle to transfer this data to main memory once the first position in the buffer has valid write-back or external bus data.

If, in INQUIRY 78, data in the cache is not marked as dirty, the method proceeds along the "NO" branch to STEP 82, "COMPLETE WRITE TO MAIN MEMORY FROM MERGE BUFFER." Because no updated data exists in the cache, the most recent data from the I/O bus master now resident in the merge buffer is simply written to main memory by the memory controller.

Figure 5:
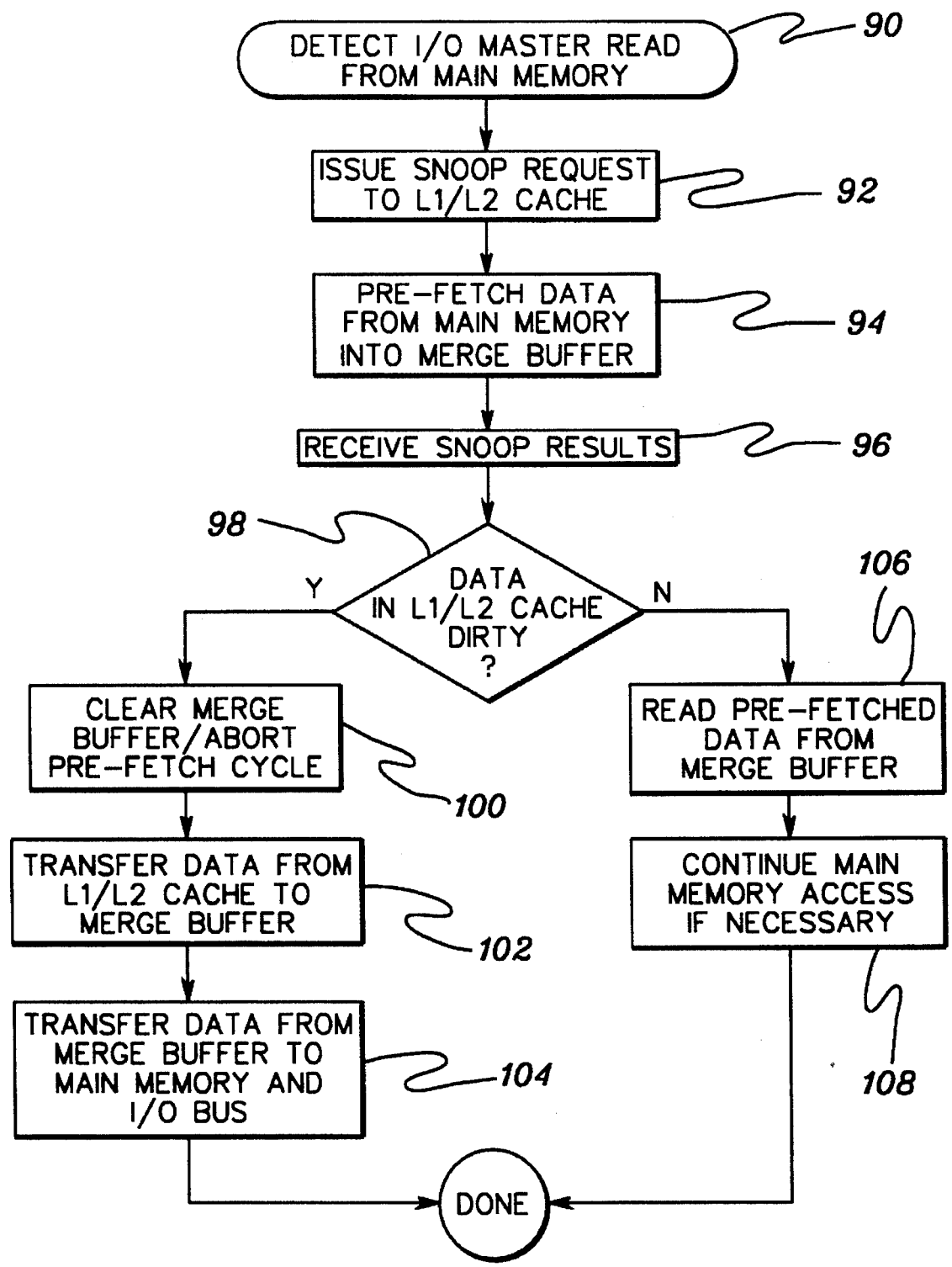
FIG. 5 is a flow diagram for a "read" from main memory, using a merge buffer, in accordance with the principles of the present invention.

Pursuant to the principles of the present invention, read requests from an I/O bus master from main memory are also provided. With reference to FIG. 5, an exemplary method commences with STEP 90, "DETECT I/O MASTER READ FROM MAIN MEMORY." In this situation, the I/O master is requesting data from main memory. However, as discussed above, the potential exists that updated data elements exist in the L1/L2 cache. Should a read request be issued directly to main memory, the most recent data would not be retrieved from main memory thereby corrupting the I/O bus master. Thus, STEP 92 "ISSUE SNOOP REQUEST TO L1/L2 CACHE," is performed in which a snoop request is initiated to the store-in cache. Pursuant to the principles of the present invention, STEP 94 "PRE-FETCH DATA FROM MAIN MEMORY INTO MERGE BUFFER" occurs, in which during the snoop cycle, data from main memory is transferred into the merge buffer. This transfer is in anticipation of snoop request results indicating that the data in the L1/L2 cache is not updated with respect to corresponding data in main memory. STEP 96 "RECEIVE SNOOP RESULTS" then occurs, followed by INQUIRY 98 "DATA IN L1/L2 DIRTY?" If the data in the store-in cache is not dirty, i.e., not updated with respect to corresponding data in main memory, the method proceeds along the "NO" branch and the pre-fetched data to STEP 106 "READ PRE-FETCHED DATA FROM MERGE BUFFER," in which the data from the merge buffer is simply read, having already been pre-fetched from main memory. If the main memory pre-fetch does not progress far enough to fully satisfy the read request, STEP 108 "CONTINUE MAIN MEMORY ACCESS IF NECESSARY" occurs, in which main memory data is placed directly on the I/O bus. This remaining data represents data that was not pre-fetched into the merge buffer, but which nevertheless is from memory locations for which the negative snoop results of the store-in cache apply.

If the data in the store-in cache is dirty, or updated with respect to corresponding data in main memory, the method proceeds along the "YES" branch to STEP 100 "CLEAR MERGE BUFFER/ABORT PRE-FETCH CYCLE." A dirty condition in the store-in cache necessitates a write-back cycle. However, the write-back cycle is modified pursuant to the principles of the present invention such that the write-back cycle includes STEP 102 "TRANSFER DATA FROM L1/L2 TO MERGE BUFFER" and STEP 104 "TRANSFER DATA FROM MERGE BUFFER TO MAIN MEMORY AND I/O BUS." Thus, STEPS 100–104 replace a conventional write-back cycle followed by a main memory access from the I/O device. The merge buffer is cleared (of the pre-fetched data because it is no longer valid) and the write-back occurs from the store-in cache into the merge buffer. However, the merge buffer data is then written to two places (the I/O device and main memory) at the same time. This results in the optimization that a fully completed write-back cycle to main memory is not necessary before the I/O bus receives the data from the store-in cache.

Thus, two optimizations are present during a read request pursuant to the principles of the present invention. First, data is pre-fetched from the main memory into the merge buffer during the snoop cycle. This results in the performance optimization that if the data in the store-in cache is not updated, the data can be passed directly from the merge buffer to the I/O bus. Second, should the snoop results indicate updated data in the store-in cache, the write-back cycle is modified such that data is simultaneously provided to the requesting I/O bus master and to main memory.

During a snoop cycle, additional optimizations are possible. For example, for a read or write operation, the associated addresses in main memory can be pre-charged with a column access strobe in anticipation of a memory access.

As discussed above with reference to FIG. 1, an additional store-in cache can be installed on the memory controller. This cache is illustrated in FIG. 1 as L3 cache 42. One skilled in the art will recognize that the implementation of this L3 cache between the components of the memory controller, including the I/O bus controller 30 and the merge buffer 28, is similar to that of a store-in cache L2 between a CPU 12 and a main memory 36. Thus, main memory accesses can be further optimized with this additional cache between the memory controller components and the memory 36. The addition of the L3 cache on the memory controller results in the same concerns discussed above regarding the L1/L2 cache. There is a potential difference between the data stored in the L3 cache and the data stored in the main memory. Thus, the read and write request methods discussed above with reference to FIGS. 4 & 5 require modifications. These modifications are represented in the exemplary "write" method illustrated in FIG. 6 and the exemplary "read" method illustrated in FIG. 7.

Figure 6:
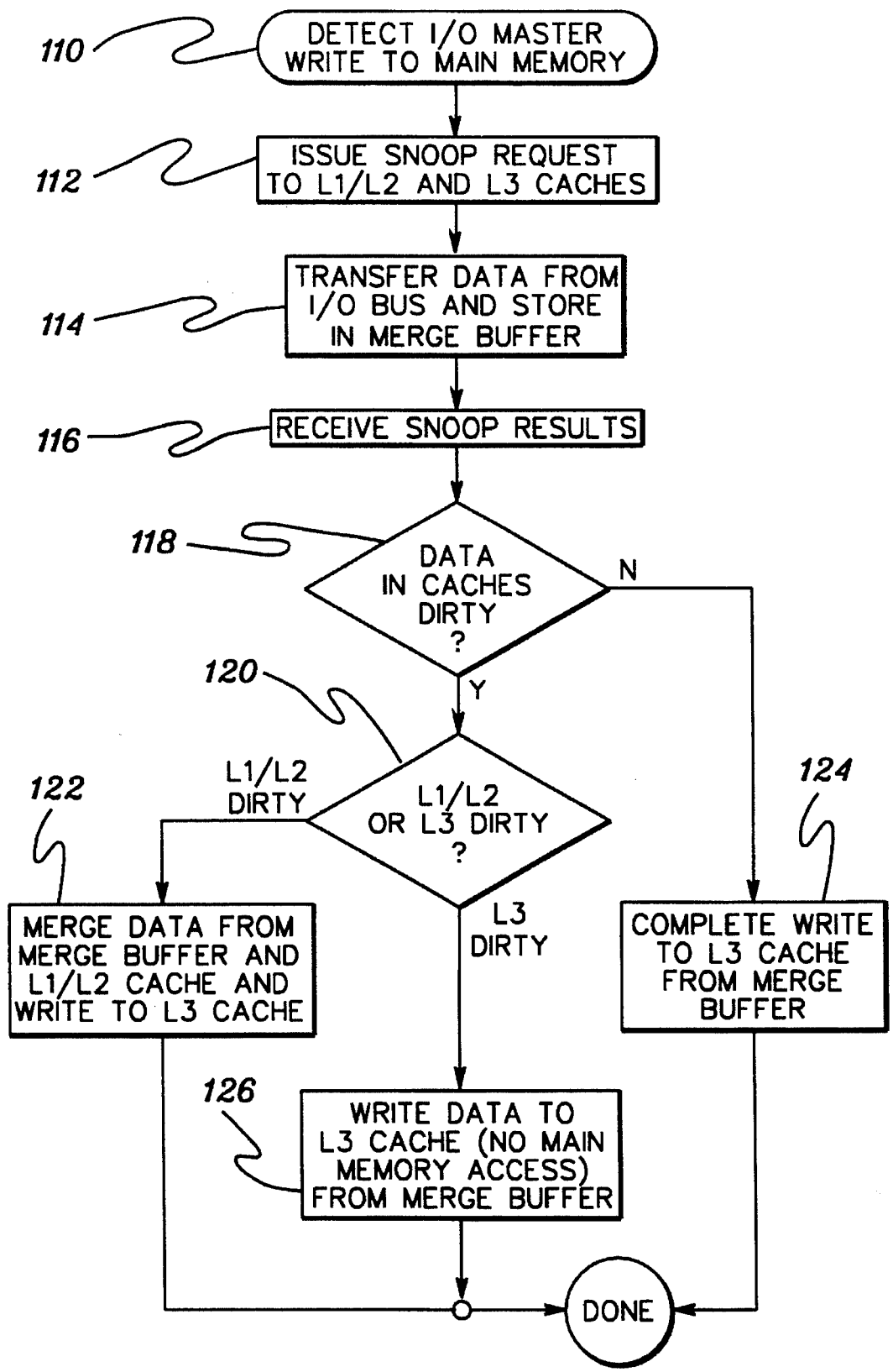
FIG. 6 is a flow diagram for a "write" to main memory, using a second store-in cache (L3) and a merge buffer, in accordance with the principles of the present invention.

With reference to FIG. 6 (an I/O master write) entry is made through STEP 110 "DETECT I/O MASTER WRITE TO MAIN MEMORY" after which STEP 112 "ISSUE SNOOP REQUEST TO L1/L2 AND L3 CACHES" is performed. Snoop or check cycles are performed for both the store-in cache associated with the CPU and the store-in cache onboard the memory controller. During the snoop cycle, STEP 114 "TRANSFER DATA FROM I/O BUS AND STORE IN MERGE BUFFER" occurs in which, as discussed above, the I/O master begins transferring data elements into the merge buffer for a subsequent write to main memory. Upon STEP 116 "RECEIVE SNOOP RESULTS," INQUIRY 118 "DATA IN CACHES DIRTY?" is performed. If neither of the caches is dirty, the "NO" branch is followed from INQUIRY 118 and a write to the L3 cache in STEP 124 "COMPLETE WRITE TO L3 CACHE FROM MERGE BUFFER" is performed. The data in either cache has not been updated with respect to corresponding data in main memory and thus, the data elements temporarily stored in the merge buffer can be transferred directly to the L3 cache.

If the "YES" branch is followed in INQUIRY 118, INQUIRY 120 "L1/L2 OR L3 DIRTY?" occurs in which a determination is made as to whether the dirty or updated status indicator is associated with the L1/L2 cache or the L3 cache. If the L1 or L2 cache is updated, STEP 122 "MERGE DATA FROM MERGE BUFFER IN L1/L2 CACHE AND WRITE TO L3 CACHE" is encountered. This is the same general step encountered in the "write" method described above, except that the write is performed directly to the L3 cache rather than main memory. If the L3 cache is dirty, no merge need be performed from the L1/L2 cache and the data is written directly to the L3 cache from the merge buffer in STEP 126 "WRITE DATA TO L3 CACHE (NO MAIN MEMORY ACCESS) FROM MERGE BUFFER."

Figure 7:
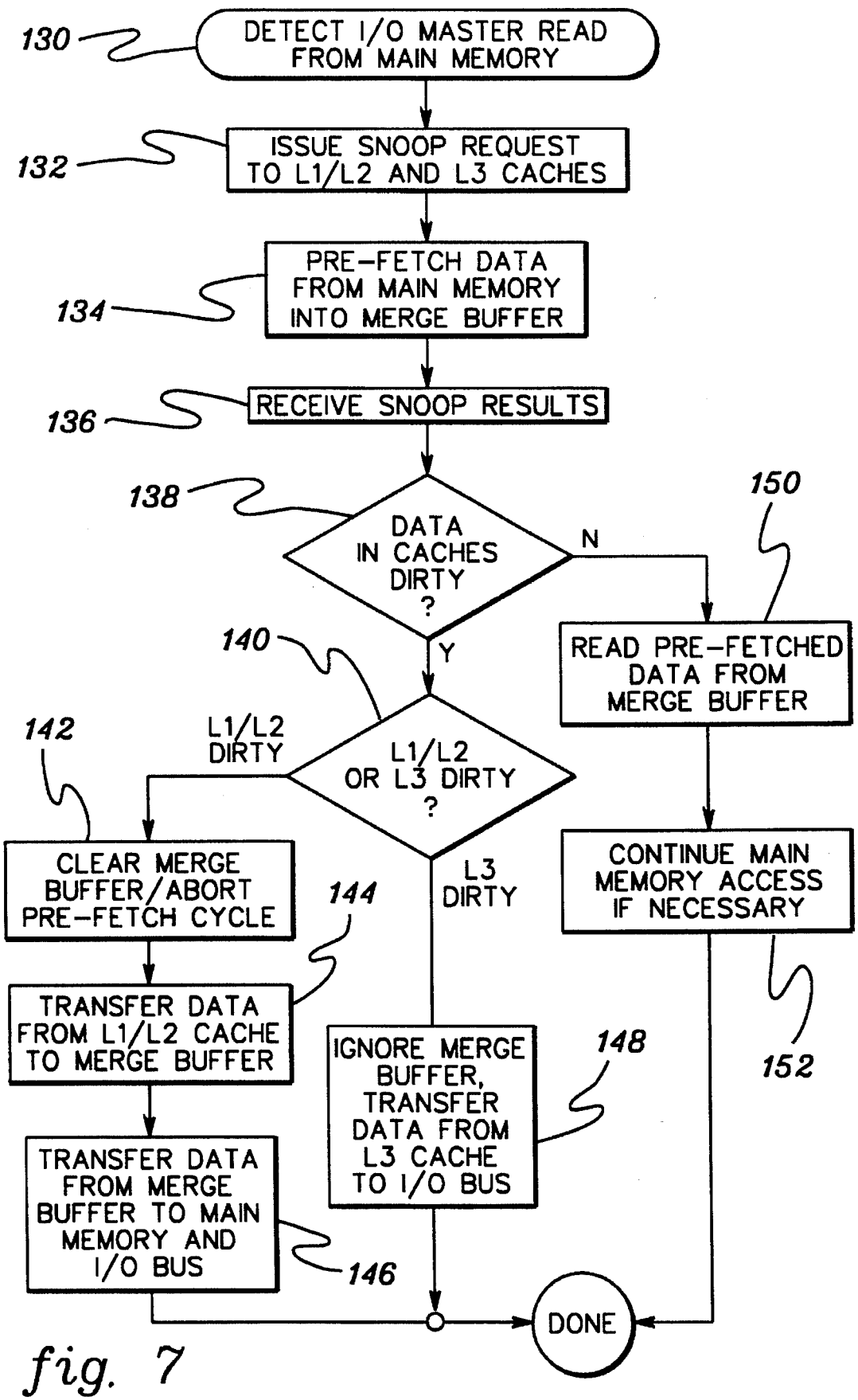
FIG. 7 is a flow diagram for a "read" from main memory, using a second store-in cache (L3) and a merge buffer, in accordance with the principles of the present invention.

With reference to FIG. 7, an I/O bus master read operation is illustrated. Entry is made through STEP 130 "DETECT I/O MASTER READ FROM MAIN MEMORY." STEP 132 "ISSUE SNOOP REQUEST TO L1/L2 AND L3 CACHES" is encountered. Again, as discussed above, the caches require checking for update status with respect to corresponding data in main memory. During the snoop request, STEP 134 "PRE-FETCH DATA FROM MAIN MEMORY INTO MERGE BUFFER" is performed in which, in anticipation of negative snoop results, data from main memory is transferred into the merge buffer during the snoop request. Upon reception of snoop results in STEP 136 "RECEIVE SNOOP RESULTS," INQUIRY 138 "DATA IN CACHES DIRTY?" is encountered. If none of the caches contain data which is updated with respect to corresponding data in main memory, the "NO" branch is followed to STEP 150 "READ PRE-FETCHED DATA FROM MERGE BUFFER", followed by STEP 152 "CONTINUE MAIN MEMORY ACCESS IF NECESSARY."

If in INQUIRY 138 it is determined that any of the data in the caches is dirty, the "YES" branch is followed to INQUIRY 140 "L1/L2 OR L3 DIRTY?" If data in the L1/L2 cache is dirty, i.e., updated with respect to a corresponding data in main memory, STEP 142 is encountered in which the merge buffer is cleared and the pre-fetch Cycle is aborted. STEP 144 "TRANSFER DATA FROM L1/L2 CACHE TO MERGE BUFFER" is then encountered, which comprises the modified write-back cycle pursuant to the principles of the present invention. Data is first transferred into the merge buffer in STEP 144 "TRANSFER DATA FROM L1/L2 CACHE TO MERGE BUFFER," and STEP 146 "TRANSFER DATA FROM MERGE BUFFER TO MAIN MEMORY AND I/O BUS" is encountered, in which the data is simultaneously sent both to the requesting I/O device via the I/O bus and to main memory thereby simultaneously updating main memory and satisfying the read request. If in INQUIRY 140 the L3 cache was determined to be dirty, STEP 148 "IGNORE MERGE BUFFER, TRANSFER DATA FROM L3 CACHE TO I/O BUS" is encountered in which the pre-fetched data in the merge buffer is no longer valid since updated data is contained in the L3 cache which can be sent directly from the L3 cache to the I/O bus. Those skilled in the art will recognize that the L3 cache, and the read/write methods associated therewith, can be easily modified to support a variety of system requirements without departing from the scope of the present invention.

One exemplary embodiment of the present invention is that in which the I/O bus 40 in FIG. 1 comprises the Peripheral Component Interconnect ("PCI") bus and in which processor 12 comprises a Pentium™ processor.

Reference may be made to the publications: *PCI Local Bus Specification, Production Version*, Revision 2.0, PCI Special Interest Group, Apr. 30, 1993; and *Pentium™ Processor User's Manual, Volume 3: Architecture and Programming Manual*, Intel Corporation, 1993, for additional detail regarding the PCI bus and the Pentium™ processor, respectively.

In this embodiment, the merge buffer of FIG. 2 is implemented with a set of registers that are all a double word wide (32 bits) since this is the size of each data transfer from the PCI bus. These registers could be 64 bits wide if a 64-bit PCI bus is used. The merge buffer is the same size as the line size of the L1/L2 cache. For example, a Pentium™-based system would have a cache line size of 32 bytes. The merge buffer is thus implemented with eight 32-bit registers, each one corresponding to one double word of the cache line.

Along with each 32-bit register is another 4-bit register that contains byte enable information for each byte in the 32-bit register. Since a PCI master can have any combination of byte enables active for any data transfer, this 4-bit register contains and stores this information from the PCI bus. Each bit set in this register indicates that the corresponding byte in the 32-bit register is valid, that it contains the most recent data for that byte, and is ready to be transferred to memory. When less than 4 bytes of data are received from a PCI master, the invalid bytes will be filled in with write-back data from the L1/L2 cache if a write-back occurs.

As shown in FIG. 3, before each register of the merge buffer is a multiplexer that provides the data from the appropriate source into the buffer. In this exemplary embodiment, each buffer can receive new data from one of four places: PCI bus, CPU/external cache bus, the memory bus, or a temporary buffer. Which bus is enabled to load data into the register is dependent on the type of cycle active at the time (read or write to memory), and whether the L1/L2 cache contains modified data for that cache line that requires write-back to memory.

A series of multiplexers is also provided on the outputs of the registers. These multiplexers select the data in one of the eight registers and pass that data to either the memory bus or the PCI bus. To control the multiplexers on the inputs and outputs of the registers are a series of 3-bit counters. These counters keep track of the lower 3 bits of the current address on the PCI bus, CPU bus, and memory bus.

In addition to the registers that correspond to the cache line size, there is one other double word wide register used as a temporary buffer. This register is specific to a PCI implementation and is necessary because a PCI master can pace its own transfer rate by using the IRDY# signal on the PCI bus. The use of this temporary buffer will be discussed in more detail below.

When the memory controller has detected that a PCI master requires access to memory, it determines whether it is a read or write cycle. If it is a write cycle, the memory controller will start a snoop to the L1/L2 caches and begin receiving data from the PCI master into the merge buffer. Note that the PCI master can be transmitting new data every clock cycle or inserting wait states via the IRDY# signal. The lower 3 bits of the PCI address are stored in the PCI address counter. These 3 bits will determine which register in the buffer will hold the first data and byte enables transferred. The 8 registers correspond to the 8 double words in a cache line. If the lower 3 bits of the PCI address point to the third word of the cache line, then the data and byte enables of the first data phase will be placed in the third register. After each data transfer, the PCI address counter will increment to allow the PCI data to flow through the multiplexer into the fourth registers. This will continue until either the last register (indicating the end of that cache line) has data from the PCI master, or the snoop is complete either returning a clean result or a write-back of modified data. If the write-back occurs, the CPU address counter takes control of the multiplexers. This counter starts at the beginning of the cache line and increments with each data transmission from the CPU bus. Note that in the case of a 64-bit CPU bus, two 32-bit registers in the merge buffer would be selected at the same time. As each write-back data is received, it is loaded into the selected register only if the corresponding bytes for that data are still not marked "valid," that is, that the corresponding byte enable bit is not set as containing new data from the PCI bus. When the write-back is complete, the merge buffer registers contain full cache lines of data.

The PCI master can transfer data every clock or insert wait states as needed until it is ready to transmit the next data. As the write cycle begins, the memory controller is ready to accept data every clock as long as that data is still on the same cache line. If the master requires transfer of data into the next cache line, the memory controller will insert wait states on the PCI bus to hold-off data transmission from the PCI master until the snoop is complete and the first cache line's data is transferred from the merge buffer to memory. Once an L1/L2 cache starts transmitting write-back data, the CPU address counter takes control of the multiplexers to load the write-back data into the registers.

The possibility exists at this time that the PCI master is inserting wait states on the PCI bus and that the memory controller has signalled that it is ready to receive the next data from the master. If the master transfers this data while the CPU address counter has control of the input multiplexers, then the memory controller receives the data off the PCI bus and loads it into the temporary buffer. When the write-back is complete, the data is transferred out of the temporary buffer and into the appropriate register in the merge buffer. If the write-back is complete, and the PCI master has not transferred all the required data for that cache line, this data will be received from the PCI bus and into the appropriate registers over the write-back data the cache sent. Once the fully merged line with all the updated data from the PCI master is in the buffer, it is transferred to main memory.

If the PCI master requires transfer of data into the next cache line (and possibly more cache lines) once the first cache line is sent to memory, the registers are cleared and the process is repeated for the second cache line and all of the following cache lines until the PCI master has completed its transfer.

It is possible for the merge buffer to receive a complete new cache line of data from the PCI master before the results of the snoop are known. The PCI master could also transmit data using the "write and invalidate" PCI command which insures that it will send a full cache line or multiples of a full cache line. In either of these cases, once the new cache line's worth of data is received from the PCI bus into the merge buffer, it is sent immediately to memory and possible write-backs from the cache are ignored.

If the PCI master requires data from memory in a read operation, the above scenario is different. Once the cycle starts, the memory controller simultaneously starts the snoop to the L1/L2 cache, and also starts a pre-fetch cycle from memory. This will allow the merge buffer to have a cache line's worth of data ready to transmit to the master if the snoop returns clean. If the snoop returns modified data from the cache, the pre-fetch cycle to memory is aborted and the write-back data is loaded into the merge buffer over the pre-fetched data. The data in the merge buffer is then sent to both the PCI master and to memory. This can be implemented in two ways. The first involves transmitting the data to both destinations at the same pace, which pace would be whichever is slower, memory or the PCI master. The second involves adding a second counter and output multiplexer and send the data from the merge buffer to both the PCI bus and the memory bus independently. When both the PCi bus and memory have received the data from that cache line, the snoop and pre-fetch process is repeated if the PCI masters require data from the next cache line.

While the invention has been described in detail herein in accordance with certain preferred embodiments thereof, many modifications and changes therein may be affected by those skilled in the art. Accordingly, it is intended by the following claims to cover all such modifications and changes as fall within the true spirit and scope of the invention.

What is claimed is:

1. In a computer system having: a main memory with a plurality of storage locations, the plurality of storage locations having a plurality of memory addresses corresponding thereto; a first memory having a plurality of storage locations for holding a plurality of first data elements, the plurality of first data elements having the plurality of memory addresses associated therewith and a first update indicator associated therewith for indicating whether a data element of the plurality of first data elements has been updated with respect to a corresponding data element stored at one of the plurality of storage locations of main memory; and means for checking status of the first update indicator in response to a main memory write request from a secondary processor; a memory control system comprising:

a second memory for storing at least one second data element from said secondary processor in response to said main memory write request, the at least one second data element having associated therewith one of the plurality of memory addresses corresponding to the plurality of storage locations of main memory, the at least one second data element to be written to main memory using said one of the plurality of memory addresses corresponding to the plurality of storage locations of main memory when the computer system's means for checking has completed checking the status of the first update indicator associated with the first plurality of data elements.

2. The memory control system of claim 1, wherein the second memory stores the at least one second data element while the computer system's means for checking is checking the status of the first update indicator associated with the plurality of first data elements.

3. The memory control system of claim 1, further comprising:

writing means for writing to the plurality of storage locations of main memory when said computer system's means for checking has completed checking status of the first update indicator associated with the first plurality of data elements, said writing means including:

first means for writing to the plurality of storage locations of main memory at least one first data element from the first memory and the at least one second data element from the second memory if the first update indicator indicates that one of the plurality of first data elements is updated with respect to a corresponding data element stored at one of the plurality of storage locations of main memory; and second means for writing to the plurality of storage locations of main memory only the at least one second data element from the second memory if the first update indicator indicates that none of the plurality of first data elements is updated with respect to a corresponding data element stored at one of the plurality of storage locations of main memory.

4. The memory control system of claim 3, wherein the second memory comprises a plurality of storage locations for storing a plurality of second data elements when said computer system's means for checking has completed checking the status of the first update indicator associated with the plurality of first data elements, the plurality of second data elements comprising the at least one second data element, each or the second memory's plurality of storage locations having a valid indicator corresponding thereto for indicating whether a data element stored therein is to be written to main memory, and wherein the first means for writing further includes:

means for writing a second data element stored in a storage location of the second memory to main memory if the valid indicator corresponding to said storage location indicates that the stored second data element is to be written to main memory.

5. The memory control system of claim 4, wherein the first means for writing further includes:

means for transferring the at least one first data element to a storage location of the second memory if the valid indicator corresponding to said storage location of the second memory indicates that a data element stored therein is not to be written to main memory; and means for writing the transferred at least one first data element from said storage location to main memory.

6. The memory control system of claim 4, wherein the first memory comprises a store-in cache and the first memory's plurality of storage locations comprise a cache line of the store-in cache, said cache line having X storage locations, and wherein the second memory comprises storage locations for X data elements.

7. The memory control system of claim 6, wherein the writing means comprises write-back cycle means associated with said store-in cache.

8. The memory control system of claim 1, further comprising means for performing a column access strobe to main memory while said computer system's means for checking is checking the status of the update indicator associated with the plurality of first data elements.

9. The memory control system of claim 1, wherein the computer system's first memory comprises a store-in cache located on a central processor of said computer system.

10. The memory control system of claim 9, wherein the memory control system's second memory comprises a merge buffer located on a memory controller of said memory control system.

11. The memory control system of claim 1, wherein the computer system's first memory comprises a serial store-in cache located on a central processor bus of said computer system.

12. The memory control system of claim 1, wherein the first memory comprises a look-aside store-in cache located on a central processor bus of said computer system.

13. The memory control system of claim 1, further comprising:

a third memory having a plurality of storage locations for holding a third plurality of data elements, the plurality of third data elements having the plurality of memory addresses associated therewith and a second update indicator associated therewith for indicating whether a data element of the plurality of third data elements has been updated with respect to a corresponding data element stored at one of the plurality of storage locations of main memory; and means for checking status of the second update indicator.

14. The memory control system of claim 13, further comprising:

writing means for writing to the plurality of storage locations of the third memory when said computer system's means for checking and said memory control system's means for checking have completed checking status of the first and second update indicators respectively, said writing means including:

first means for writing to the third plurality of storage locations of the memory from the first memory and the second memory if the first update indicator indicates that one of the plurality of first data elements is updated with respect to a corresponding data element stored at one of the plurality of storage locations of main memory;

second means for writing to the plurality of storage locations of the third memory only from the second memory if the second update indicator indicates that one of the plurality of third data elements is updated with respect to a corresponding data element stored at one of the plurality of storage locations of main memory; and third means for writing to the plurality of storage locations of the third memory only from the second memory if the first update indicator indicates that none of the plurality of first data elements is updated with respect to a corresponding data element stored at one of the plurality of storage locations of main memory, and the second update indicator indicates that none of the plurality of third data elements is updated with respect to a corresponding data element stored at one of the plurality of storage locations of main memory.

15. The memory control system of claim 13, wherein the third memory comprises a store-in cache located on a memory controller of said memory control system.

16. In a computer system having a main memory and a first store-in cache associated therewith for storing cached data, said cached data having associated therewith a first update indicator for indicating whether a data element of the cached data has been updated with respect to a corresponding data element in main memory, a method for responding to a request from a secondary processor to write secondary processor data to said main memory, said method comprising the steps of:

(a) checking the first update indicator associated with the cached data in said first store-in cache upon said request; and (b) simultaneous with said checking step (a), using a buffer to temporarily store secondary processor data from the secondary processor, the secondary processor data to be written to main memory after completion of said checking step (a).

17. The method of claim 16, further comprising the step of:

(c) merging the secondary processor data stored in the buffer and the cached data from the first store-in cache into a data stream to be written to main memory if the first update indicator indicates that a data element of the cached data is updated with respect to a corresponding data element in main memory.

18. The method of claim 17, wherein the main memory has a second store-in cache associated therewith and further comprising writing said data stream to said second store-in cache.

19. The method of claim 17, further comprising the step of writing said data stream to main memory.

20. The method of claim 16, further comprising the step of:

(c) writing the secondary processor data stored in the buffer to main memory if the update indicator indicates that none of the data elements of the cached data has been updated with respect to a corresponding data element in said main memory.

21. The method of claim 16, wherein the buffer comprises a plurality of buffer storage locations, each of said plurality of buffer storage locations having a valid indicator corresponding thereto for indicating whether a data element stored therein is to be written to main memory, wherein each valid indicator corresponding to each of said plurality of buffer storage locations is "set" if a data element stored therein is to be written to main memory, wherein the using step (b) further includes the steps of:

(i) transferring at least one secondary processor data element to be written to main memory into one of the plurality of buffer storage locations; and (ii) setting the valid indicator corresponding to said one of the plurality of buffer storage locations to indicate that the at least one secondary processor data element transferred thereto is to be written to main memory.

22. The method of claim 21, wherein if the first indicator indicates that a data element of the cached data is updated with respect to a corresponding data element in main memory, said method further comprises the steps of:

(c) transferring at least one data element of said cached data into one of said plurality of buffer storage locations if the valid indicator corresponding to the one of said plurality of buffer storage locations indicates that a data element stored therein is not to be written to main memory; and (d) writing the transferred at least one data element of said cached data and the transferred at least one secondary processor data element from the buffer to main memory.

23. The method of claim 21, wherein if the first update indicator indicates that a data element of the cached data is updated with respect to a corresponding data element in main memory, said method further comprises the step of:

(c) performing a write-back cycle, including the steps of:

(i) transferring data elements from said cached data into buffer storage locations not having their corresponding valid indicators "set"; and (ii) writing transferred data elements from said plurality of buffer storage locators to main memory.

24. The method of claim 16, wherein the main memory has a second store-in cache associated therewith for storing second cached data, said second cached data having an update indicator associated therewith for indicating whether a data element of the second cached data has been updated with respect to a corresponding data element in main memory, the method further comprising the steps of:

(c) checking the second update indicator of said second cached data upon said request; and (d) writing the secondary processor data stored in the buffer to the second store-in cache if the second update indicator indicates that a data element of the second cached data is updated with respect to a corresponding data element in main memory.

25. The method of claim 24, further comprising the step of:

(e) writing the secondary processor data from the buffer to the second store-in cache if the first update indicator indicates that none of the data elements of the first cached data is updated with respect to a corresponding data element in main memory and the second update indicator indicates that none of the data elements of the second cached data is updated with respect to a corresponding data element in main memory.

26. In a computer system having a main memory, a primary processor, a store-in cache for said primary processor, a secondary processor, and a buffer having a plurality of buffer storage locations, and wherein the computer system performs a plurality of write-back cycles, each write-back cycle updating the main memory with a data stream from said store-in cache, said data stream comprising data elements, a method for responding to a main memory write request from the secondary processor, said method comprising the step of:

(a) inserting secondary processor data elements from the secondary processor into the data stream during at least one of the write-back cycles, including (i) buffering the secondary processor data elements from the secondary processor in a first at least one of said plurality of said buffer storage locations such that a second at least one of said plurality of buffer storage locations remains available, and (ii) transferring data elements from said store-in cache into the second at least one of said plurality of buffer storage locations such that the data stream comprises data elements stored in the first and second at least one of said plurality of buffer storage locations.

27. The method of claim 26, wherein the computer system further comprises a second store-in cache and wherein the data stream is written to said second store-in cache.

28. In a computer system having: a main memory with a plurality of storage locations, the plurality of storage locations having a plurality of memory addresses corresponding thereto; a first memory having a plurality of storage locations for holding a plurality of first data elements, the plurality of first data elements having the plurality of memory addresses associated therewith and a first update indicator associated therewith for indicating whether a data element of the plurality of first data elements has been updated with respect to a corresponding data element stored at one of the plurality of storage locations of main memory; and means for checking status of the first update indicator in response to a main memory read request from a secondary processor; a memory control system comprising:

a second memory for storing at least one second data element in response to said main memory read request, the at least one second data element having associated therewith one of the plurality of memory addresses corresponding to the plurality of storage locations of main memory, the at least one second data element to be provided to the secondary processor when the computer system's means for checking has completed checking the status of the first update indicator associated with the first plurality of data elements.

29. The memory control system of claim 28, further comprising means for receiving the at least one second data element from one of the plurality of storage locations of main memory into the second memory while the computer system's means for checking is checking the status of the first update indicator associated with the plurality of first data elements.

30. The memory control system of claim 28, further comprising means for providing the at least one second data element to a secondary processor if the first update indicator indicates that none of the plurality of first data elements is updated with respect to a corresponding data element in main memory.

31. The memory control system of claim 28, further comprising:

means for transferring the plurality of first data elements from said first memory to said second memory if the first update indicator indicates that one of the plurality of first data elements is updated with respect to a corresponding data element in main memory; and means for concurrently writing the transferred plurality of first data elements from the second memory to main memory and at least one of the transferred plurality of first data elements to the secondary processor.

32. The memory control system of claim 31, wherein the first memory comprises a store-in cache and the first memory's plurality of storage locations comprise a cache line of the store-in cache, said cache line have X storage locations, and wherein the second memory comprises storage locations for X data elements.

33. The memory control system of claim 32, wherein the means for transferring and the means for concurrently writing comprise write-back cycle means associated with said store-in cache.

34. The memory control system of claim 28, wherein the computer system's first memory comprises a store-in cache located on a central processor of said computer system.

35. The memory control system of claim 28, wherein the computer system's first memory comprises a serial store-in cache located on a central processor bus of said computer system.

36. The memory control system of claim 28, wherein the first memory comprises a look-aside cache located on a central processor bus of said computer system.

37. The memory control system of claim 28, further comprising:

a third memory having a plurality of storage locations for holding a plurality of third data elements, the plurality of third data elements having the plurality of memory addresses associated therewith and a second update indicator associated therewith for indicating whether a data element of the plurality of third data elements has been updated with respect to a corresponding data element stored at one of the plurality of storage locations of main memory; and means for checking status of the second update indicator.

38. The memory control system of claim 37, further comprising:

means for providing at least one of the plurality of third data elements from the third memory to the secondary processor if the second update indicator indicates that a data element of the plurality of third data elements is updated with respect to a corresponding data element stored at one of the plurality of storage locations of main memory.

39. In a computer system having a main memory and a first store-in cache associated therewith for storing cached data, said cached data having associated therewith a first update indicator for indicating whether a data element of the cached data has been updated with respect to a corresponding data element in main memory, a method for responding to a request from a secondary processor to read at least one memory data element from said main memory, said method comprising the steps of:

(a) checking the first update indicator associated with the cached data in said first store-in cache in response to said request; and (b) simultaneous with said checking step (a), using a buffer to temporarily store the at least one memory data element, the at least one memory data element being pre-fetched from said main memory into said buffer.

40. The method of claim 39, wherein if the update indicator indicates that a data element of said cached data has been updated with respect to a corresponding data element in main memory, said method further comprises the steps of:

(c) transferring said cached data to said buffer thereby overwriting the at least one prefetched memory data element; and (d) concurrently providing said transferred cached data from said buffer to the secondary processor and main memory.

41. The method of claim 39, wherein if the first update indicator indicates that a data element of the cached data is updated with respect to a corresponding data element in main memory, said method further comprises the step of:

(c) performing a write-back cycle, including transferring said cached data to main memory and the secondary processor.

42. The method of claim 39, further comprising the step of (c) transferring the at least one prefetched memory data element from the buffer to the secondary processor if the update indicator indicates that none of the data elements of the cached data has been updated with respect to a corresponding data element in said main memory.

43. The method of claim 39, wherein the main memory has a second store-in cache associated therewith for storing second cached data, said second cached data having a second update indicator associated therewith for indicating whether a data element of the second cached data has been updated with respect to a corresponding data element in main memory, the method further comprising the step of:

(c) transferring the second cached data from the second store-in cache to the secondary processor if the second update indicator indicates that a data element of the second cached data has been updated with respect to a corresponding data element in main memory.

* * * * *

UNITED STATES PATENT AND TRADEMARK OFFICE
CERTIFICATE OF CORRECTION

PATENT NO. : 5,553,265
DATED : Sep. 3, 1996
INVENTOR(S) : Richard P. Abato et al.

It is certified that error appears in the above-identified patent and that said Letters Patent are hereby corrected as shown below:

On the title page; and column 1, item:

[54] Title      "METHODS AND SYSTEM FOR MERGING DATA DURING CACHE CHECKING AND WRITE-BACK CYCLES FOR MEMORY READS AND WRITES"
should be
--METHODS AND SYSTEMS FOR MERGING DATA DURING CACHE CHECKING AND WRITE-BACK CYCLES FOR MEMORY READS AND WRITES--.

Signed and Sealed this

Eighteenth Day of February, 1997

Attest:

BRUCE LEHMAN

*Attesting Officer*      *Commissioner of Patents and Trademarks*